United States Patent [19]

Juan

[11] Patent Number: 5,316,100

[45] Date of Patent: May 31, 1994

[54] STATIONARY DIRECTION CHANGING DEVICE FOR A HANDLING TROLLEY

[76] Inventor: Richard Juan, 20, rue du Pont Blanc, 69360 Saint Symphorien D'Ozon (Rhone), France

[21] Appl. No.: 969,202

[22] PCT Filed: Aug. 2, 1991

[86] PCT No.: PCT/FR91/00646

§ 371 Date: Feb. 24, 1993

§ 102(e) Date: Feb. 24, 1993

[87] PCT Pub. No.: WO92/02397

PCT Pub. Date: Feb. 20, 1992

[30] Foreign Application Priority Data

Aug. 3, 1990 [FR] France .................. 90 10165

[51] Int. Cl.⁵ .............. B62D 1/24; B66F 7/24
[52] U.S. Cl. .................. 180/167; 180/8.1; 180/8.5
[58] Field of Search ......... 180/167, 169, 8.5, 8.1, 180/9.1, 168; 280/638

[56] References Cited

U.S. PATENT DOCUMENTS

| 1,914,692 | 6/1933 | Kakaska | 180/8.1 X |
| 4,336,889 | 6/1982 | McGrew | 280/638 X |
| 4,503,581 | 3/1985 | Early | 180/168 |
| 4,678,051 | 7/1987 | Dugle | 180/9.1 |
| 4,816,998 | 3/1989 | Ahlbom | 180/167 X |
| 4,938,305 | 7/1990 | Park | 180/8.5 X |
| 4,939,650 | 7/1990 | Nishikawa | 180/167 X |

FOREIGN PATENT DOCUMENTS

| 1492408 | 12/1969 | Fed. Rep. of Germany . | |
| 2449578 | 10/1980 | France | 180/168 |
| 2456653 | 12/1980 | France . | |
| 58-145573 | 8/1983 | Japan | 180/8.5 |
| 0297165 | 12/1988 | Japan | 180/168 |
| 1211111 | 2/1986 | U.S.S.R. | 180/8.5 |
| 8705888 | 10/1987 | World Int. Prop. O. | 180/9.1 |

Primary Examiner—Margaret A. Focarino
Assistant Examiner—Peter English
Attorney, Agent, or Firm—Oliff & Berridge

[57] ABSTRACT

The device has a chassis with at least a translational drive unit, a load-carrying assembly, a device for moving a ring in a vertical direction between a retracted position in which it is above the ground and a pivoting position in which it engages the floor and allows the trolley to be lifted, and a device for pivoting the trolley when it is raised in relation to the ring. The device for vertically moving the ring includes a sliding element slidably mounted in vertical channels on the chassis and having fastened to its lower end a circular plate on which the ring is free to rotate. The upper portion of the sliding element supports the vertical load-handling assembly, and the element is connected to the chassis by drives for moving the trolley and the load in a vertical direction. The drives are provided with a device for detecting the completed rectilinear travel and controlled by an on-board control device. The drives for rotating the ring are also provided with a device for detecting the completed circular travel and controlled by the on-board control device.

10 Claims, 2 Drawing Sheets

STATIONARY DIRECTION CHANGING DEVICE FOR A HANDLING TROLLEY

Currently used handling means for transporting loads or components during manufacture, for example, between a manufacturing or storage site and another manufacturing, storage or dispatch site, consist either of lifting trucks with an on-board driver, or of autonomous trolleys of the type guided by wire, guided by optoelectronics or using trigonometric direction finding, using a laser or some other means.

Whatever their driving means, current trolleys require large areas in which to move, relating to the maximum radius of their movement curve, that is to say as a function of the structure and the position of their guiding wheels. Moreover, the greater the bulk of the trolley and the larger its mass, the larger the radius. In other words, the movements of these trolleys require more space, the heavier the loads carried, which makes it necessary to organize circulation paths using a lot of space, to the detriment of production and storage areas.

Another drawback of this method of changing direction is that it produces imprecision in the position of the trolley at the end of the change of direction. Although these imprecisions may be compensated with trolleys having an on-board driver, this is not the case with autonomous trolleys. Indeed, in this case, the imprecisions of circular trajectory are added to the transverse deviation, resulting from the rectilinear displacement of the trolley, and therefore affect the precision of the final positioning of the latter.

The Japanese Patent Application 58,145,573 discloses a direction changing device for a motorized chassis comprising, on the one hand, means for vertically displacing a support ring between a transport position, in which it is above the ground, and a pivoting position, in which it rests on the ground and raises the trolley and, on the other hand, means able to cause the trolley to pivot, in the raised position, with respect to the ring.

Such a device reduces the space required for direction changes of the trolley, but it does not provide any solution to the lack of precision of this rotation and can therefore not be used on an autonomous trolley transferring, under remote control, loads between two stations, a manufacturing station or storage station, with positioning of this load with respect to the means receiving it.

Moreover, when the trolley is fitted with means for vertically handling the load, the cost of these is added to that of the elevation means of the trolley, which leads to the trolley becoming more expensive.

The object of the present invention is to provide a direction changing device which overcomes these drawbacks, that is to say which makes it possible to reduce the radius of the circular trajectories of the trolley, whilst reducing the imprecisions in positioning and this being regardless of the bulk of this trolley and the mass of the load carried by it.

For this purpose, in the device according to the invention, the means for vertically displacing the ring comprise a slide which, mounted so as to slide in vertical slideways of the chassis and carrying, wedged on its lower end, a circular plate on which the ring is mounted to rotate freely, on the one hand supports in its upper part the means for vertically handling the load and, on the other hand, is connected to the chassis by drive means able to provide the vertical displacements of the trolley and those of the load, these means being equipped with means for detecting the rectilinear travel accomplished, and slaved to on-board control means, whilst the drive means bringing about the rotation of the ring are also equipped with means for detecting the circular travel performed which are slaved to the on-board control means.

It emerges from the preceding text that the same drive means command the vertical movements of the trolley and those of the load, which makes it possible to reduce the cost of the trolley but above all to benefit, in the two movements, from the precision afforded by the control means slaving these drive means. In addition, the precision procured in the rotation of the chassis with respect to the ring, makes it possible to correct the transverse deviation of the trolley and to reduce, at the end of travel of this trolley, the imprecisions in positioning of the load which it carries with respect to the means for receiving this load.

In one embodiment of the invention, the drive means, bringing about the vertical displacements, and the drive means bringing about the rotation, each consist of a servomotor with tachometer and encoder, whilst their control means comprise a computer on board the trolley and connected via a radio link to a fixed server itself connected to sensors arranged at fixed stations on either side of the trajectory of the trolley and detecting the positional offsets of this trolley with respect to a theoretical trajectory.

By virtue of this arrangement, when the on-board computer communicates to the drive means an order for setting it in motion on a given travel, it takes into account the corrections which are communicated to it by the server, after this server has analyzed the position of the trolley with respect to its theoretical position, and thus ensures automatic correction at each direction change, which eliminates the transverse deviation and improves the precision of the positioning of the load at the reception station.

In one embodiment of the invention, the plate is securely fastened to the means for indexing the angular pivoting interacting with complementary means connected to the ring.

Thus, at the end of rotation, the indexing means positively position the trolley with respect to the ring, and guarantee the precision of the positioning of this trolley, when its translational drive means resume contact with the ground.

Other characteristics and advantages will emerge from the description which follows with reference to the appended diagrammatic drawing representing, by way of a non-limiting example, an embodiment of the device according to the invention in the case of it being applied to an autonomous trolley for transporting spools.

Figure 1:
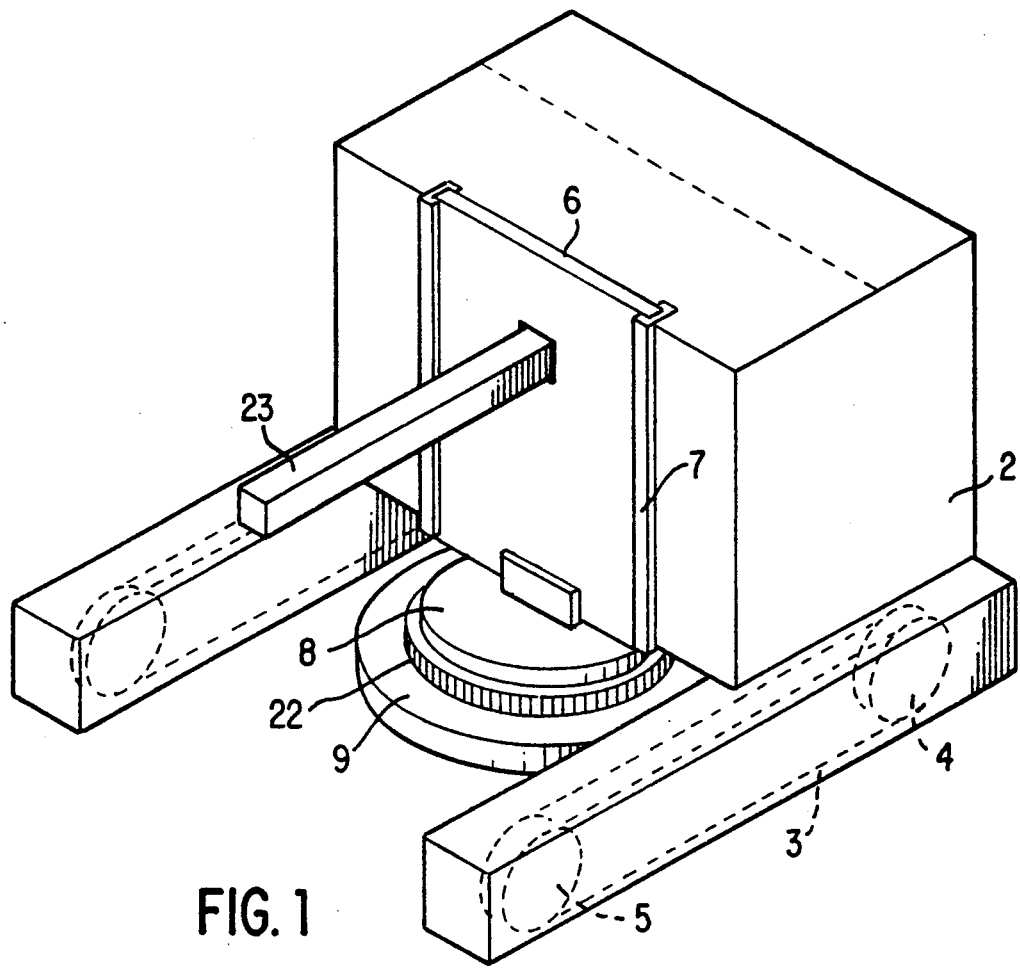
FIG. 1 is a view of the trolley in perspective.

In these drawings, 2 generally denotes the chassis of the trolley whose translational drive means consist of two caterpillar tracks 3 driven by drive wheels 4 and guided by return wheels 5. The drive wheels 4 are connected to a servomotor 4a with a tachometer and an encoder.

According to the invention, the direction changing device comprises a slide 6 mounted so as to slide in vertical slideways 7 securely fastened to the chassis 2. This slide is connected, by its lower end, to a circular plate 8 on the periphery of which there is a ring 9 mounted to rotate freely for bearing on the ground. A roller bearing race 10 is interposed between the plate 8 and the ring 9.

The slide 6 is connected to means able to impart a vertical displacement movement to it, which means in this embodiment consist of an electric servomotor 12 with tachometer and encoder 12a driving, by means of a positive transmission by pulleys and toothed belts 13, a vertical screw 14. This screw, mounted to rotate freely in bearings 15 securely fastened to the chassis, interacts with a nut 16 connected to the slide 6 by a connection component 17 also wedging it in rotation.

The ring 9 is connected to means able to impart to it a relative rotational movement about a vertical axis, which means in this embodiment consist of an electric motor 18, with tachometer and encoder 18a, fixed to the plate 8. The output shaft 19 of this motor drives a gear 20 meshing with peripheral teeth 22 of the ring 9.

Since this trolley is intended for transporting spools 31 of spiral-wound metal strips, the slide 6 is securely fastened to a spur 23 projecting longitudinally on the front of the trolley.

It should be noted here that the vertical movements necessary for transferring the load are provided by the means causing the vertical displacements of the slide and therefore do not necessitate any supplementary drive means.

It is clearly evident that the device according to the invention also applies to trolleys comprising any other device for supporting or grasping loads and, in particular, to trolleys comprising, instead of the spur, a lifting fork or a platform, which fork and platform are then securely fastened to the slide 6 and project towards the front of the latter. Likewise, the slide 6 which extends vertically over the entire height of the trolley may of course have a lower height, depending on the handling needs, and be fitted out in order to receive any type of tool adapted to the use of the trolley.

This autonomous trolley is fitted with a battery 21 providing the electrical power for the servomotors 12 and 18 and for the servomotor 4a for driving the wheels 4. These motors are powered via control means 30 comprising a computer 32 connected to the tachometers and encoders of the motors. This computer is connected via a radio link, represented diagrammatically by the antenna 33, to a server which is not shown and is itself connected to position sensors, arranged on either side of the trajectory of the trolley between its loading and unloading stations respectively.

Figure 2:
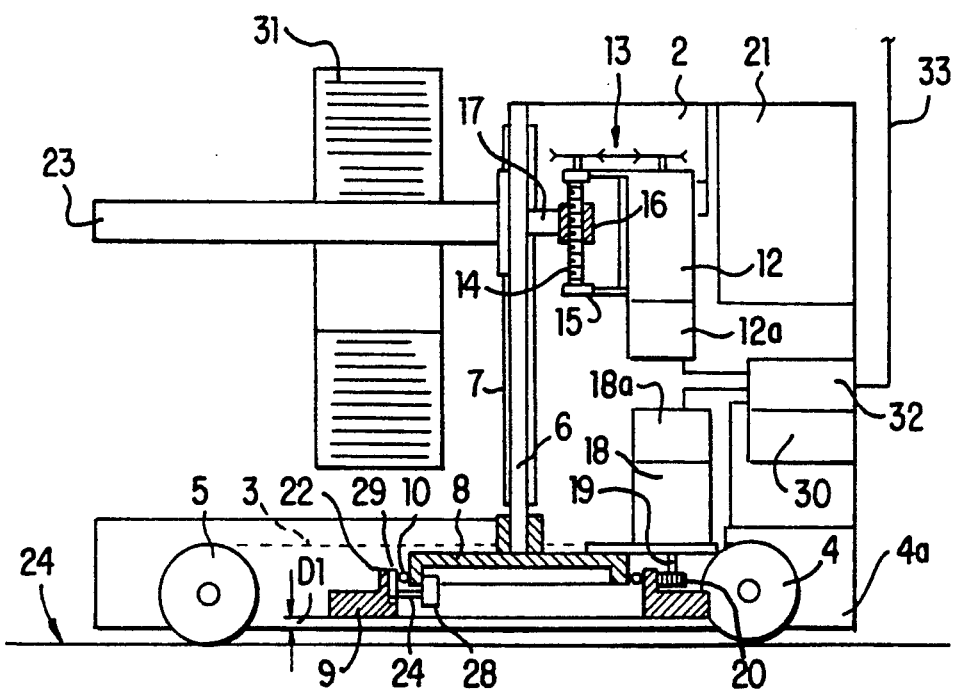
FIGS. 2 and 3 are side views in transverse section with the device in the transport position and the pivoting position respectively.

In the normal transport position, and as shown in FIG. 2, the slide 6, the plate 8 and the ring 9 are in a vertical position such that the ring 9 is at a distance D1 from the ground 24. This distance is sufficiently large to allow the vertical displacements of the spur 23 in order to grasp the spool or to set it down on a support at the exit of a manufacturing machine and at a storage site, respectively. By way of example, this distance has a value of the order of 50 mm, but it may be larger as a function of the larger travel which the grasping tool must accomplish at the loading station or at the unloading station.

Figure 3:
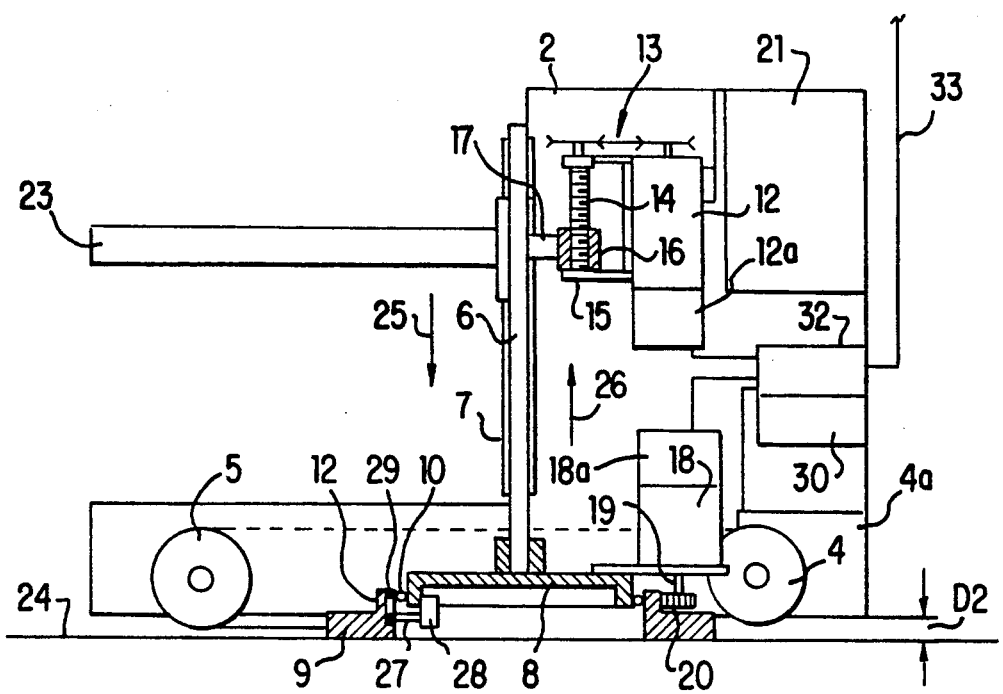

When the moving trolley arrives in a pivoting zone, it is subjected to a deceleration of its translational speed and is then stopped in a precise longitudinal position, by virtue of its servomotor 4a controlled by the control means 30. As soon as it stops, the servomotor 12 is powered so as rotationally to drive the screw 14 in order to impart a downwards vertical displacement to the slide 6 in the direction of the arrow 25 in FIG. 3. During this movement, the ring 9 carried by the plate 8 comes into contact with the ground, as shown in FIG. 3. From here, with the screw 14 continuing to rotate, it is no longer the slide 6 which moves downwards, but the assembly of the chassis 2 which is displaced vertically upwards, in the direction of the arrow 26, driving with it the longitudinal translational drive means of the trolley and, in this case, the wheels 4 and 5 with the caterpillar tracks 3. At the end of this movement, and as shown in FIG. 3, the wheels and caterpillar tracks are separated from the ground by a distance D2, having a value of the order of 10 mm, for example.

Figure 4:
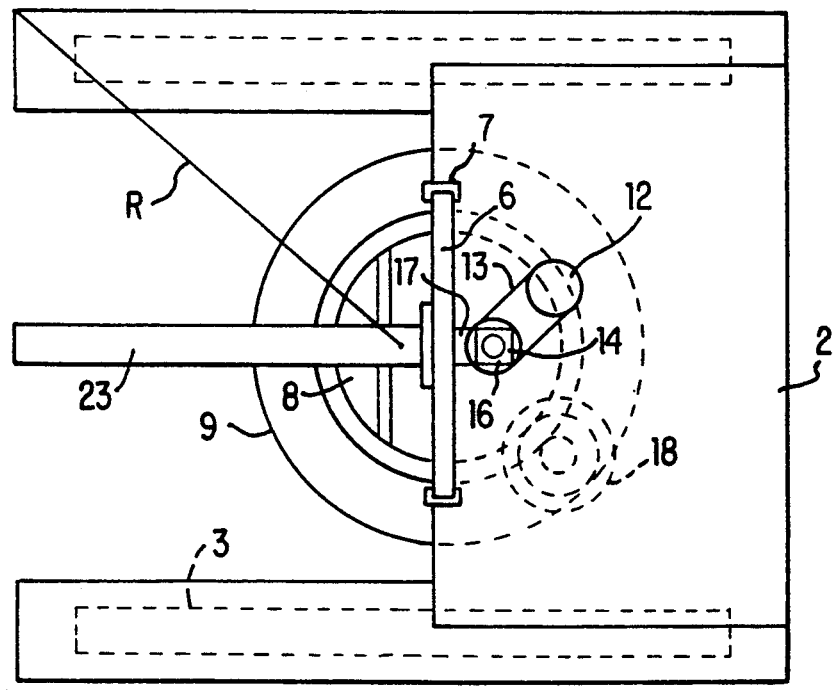
FIG. 4 is a plan view from above of the trolley before rotation.

In this position, powering the servomotor 18 leads to the rotation of the gear 20 which, by meshing with the teeth 22 of the ring 9, brings about the rotation of the plate 8 with respect to the ring 9, that is to say of the slide 6, of the spur 23, of the load and of the assembly of the chassis 2. This rotation, which may be accomplished over any angular value, requires a movement surface at most equal to the largest radius R of the bulk of the chassis (FIG. 4), that is to say to a surface which is very much smaller than that necessary for rotating a trolley equipped with guiding wheels.

This rotation is measured by the tachometer and interrupted by the encoder of the servomotor 18 under the control of the on-board computer 32. In parallel, this computer has received, via the radio link 33, the information which the server has sent to it and which take into account the corrections in trajectory defined by this server after comparing the actual position of the trolley, detected by the fixed sensors, with an ideal theoretical position in memory.

At the end of the rotation, the servomotor 12 rotationally drives, in the opposite direction, the screw 14 so as, in a first phase, to bring the sets of caterpillar tracks 3 in contact with the ground, then, in a second phase, to return the slide 6 and the elements which it carries to the transport position represented in FIG. 2.

In one embodiment, and in order further to enhance the precision of the positioning of the rotation of the trolley, the plate 8 is securely fastened to indexing means interacting with complementary means.

In the embodiment represented in FIGS. 2 and 3, the indexing means consist of a radial finger 27 mounted so as to slide with respect to the plate 8. This finger is arranged in the inner part of the plate 8 and is connected to means 28 able to displace it transversely, such as an electromagnet. Its outer and free end interacts with positioning splines 29 made on the inner face of the ring 9.

It can be seen that by a judicious choice of the pitch and modulus of the splines and the dimensions of the finger 27, and by having a precise angular distribution of the splines, it is possible to obtain a precise positioning of the trolley at the end of rotation.

In another embodiment indexing is ensured by the brake with which the servomotor 18 is provided, as, moreover, are the other servomotors 4a and 12.

It should be noted here that the precision of the rotation, with or without indexing, is independent of the load, the means for holding this load and the distance traveled, so that the device according to the invention can be used both for handling trolleys intended to carry heavy loads greater than 3 tons, and for trolleys intended for transporting medium or small loads having a value of less than 1 ton, and this is over trajectories of any length.

Independently of the reduction in ground surface necessary for pivoting the trolley, the device according to the invention allows the effect of transverse deviation on the precision of the position at the end of pivoting to be eliminated.

It also allows, with the same drive means and the same control means, precise control of the vertical displacements of the load and, at the loading and unloading stations, correction of the possible vertical positional offsets of the means for carrying or receiving the load, thus tolerating a lower degree of precision in the positioning of these means with respect to the ground and in the flatness of this ground.

Of course the invention is not limited to the trolley described above, of the type on caterpillar tracks and with a spur; it applies, on the contrary, to all autonomous trolleys, regardless of their drive means with respect to the ground and their means for carrying a load which are fixed to the slide 6, constituting a tool carrier.

I claim:

1. Stationary direction changing device for a handling trolley, of the type comprising a chassis with means for driving at least in translation, means able to carry a load, means for vertically displacing a ring between a transport position, in which it is above the ground, and a pivoting position in which it rests on the ground and allows the trolley to be raised, and drive means for making the ring rotate with respect to the raised trolley, wherein the means for vertically displacing the ring comprise a slide which is mounted so as to slide in vertical slideways of the chassis and carrying, attached to its lower end, a circular plate on which the ring is mounted to rotate freely, the slide supporting in its upper part the means able to carry a load and the slide being connected to the chassis by drive means able to provide vertical displacement of the trolley and of the load, the drive means bringing about vertical displacement of the trolley being equipped with means for detecting rectilinear travel accomplished by the trolley, and controlled by on-board control means, while the drive means bringing about the rotation of the ring are equipped with means for detecting the circular travel performed which are similarly controlled by the on-board control means.

2. Device according to claim 1, wherein the drive means, bringing about the vertical displacements, and the drive means bringing about the rotation, each consist of a servomotor with tachometer and encoder, while, their control means comprise a computer on-board the trolley and connected via a radio link to a fixed server itself connected to sensors arranged at fixed stations on either side of the trajectory of the trolley and detecting the positional offsets of the trolley with respect to a theoretical trajectory.

3. Device according to claim 1, wherein the drive means able to provide vertical displacement of the trolley comprise an electric servomotor whose body is fixed to the chassis, a vertical screw, mounted to rotate freely in fixed bearings of the chassis and rotationally connected to the shaft of the motor by means of a positive transmission of circular movement, and a nut threadably engaging the screw and fixed to means for connecting it to the slide.

4. Device according to claim 1, wherein the drive means providing the relative rotational movement between the plate and the ring comprise an electric servomotor having a body securely fastened to the plate and having an output shaft securely fastened to a gear meshing with teeth made on the periphery of the ring.

5. Device according to claim 1, wherein the means able to carry the load consist of a spur projecting longitudinally on the front of the slide.

6. Device according to claim 1, wherein the means able to carry the load consist of a horizontal plate securely fastened to the slide.

7. Device according to claim 1, wherein the means able to carry the load consist of forks projecting longitudinally on the front of the slide.

8. Device according to claim 1, wherein the plate is securely fastened to means for indexing angular pivoting of the plate and where the means for indexing angular pivoting of the plate interact with complementary means of the ring.

9. Device according to claim 8, wherein the means for indexing the plate consist of a radial finger which is coupled to means able to displace it longitudinally and whose outer and free end is able to interact with one of a plurality of positioning splines made on the inner face of the ring.

10. Device according to claim 1, wherein the drive means are fitted with a brake fixing the drive means in the stopped position and enabling the trolley to be precisely indexed.

* * * * *